United States Patent [19]

Benda et al.

[11] Patent Number: 5,415,017

[45] Date of Patent: May 16, 1995

[54] LOCKING DEVICE FOR A LEVER OPERATED VALVE

[75] Inventors: Steven J. Benda, Cokato, Minn.; John P. Pearson, Milwaukee, Wis.; Daniel A. Page, Ekeren, Belgium

[73] Assignee: Brady USA, Inc.

[21] Appl. No.: 283,450

[22] Filed: Aug. 1, 1994

[51] Int. Cl.⁶ ............................................. F16K 35/10
[52] U.S. Cl. ............................... 70/177; 70/180; 70/203; 70/212; 137/385
[58] Field of Search ................... 70/175–180, 70/210–212, 201–203; 137/385; 251/90; 403/84, 92, 96, 97, 388, 195

[56] References Cited

U.S. PATENT DOCUMENTS

| | | | |
|---|---|---|---|
| 1,057,609 | 4/1913 | Young | 70/176 |
| 1,550,487 | 8/1925 | Barnes | 70/177 |
| 1,590,032 | 6/1926 | Jauch | 70/177 |
| 1,627,082 | 5/1927 | Fisher | 70/201 |
| 1,631,831 | 6/1927 | Palmer-Jones | 403/97 |
| 3,613,410 | 10/1971 | Shaw | 70/202 |
| 5,003,797 | 4/1991 | Wirth et al. | 70/180 |
| 5,092,359 | 3/1992 | Wirth et al. | 137/382 |
| 5,215,112 | 6/1993 | Davison | 70/177 |

FOREIGN PATENT DOCUMENTS 114894  7/1945  Sweden ............................... 403/388

OTHER PUBLICATIONS

Contromatics Brand, Ball Valve Locking Device Catalog, Nov. 28, 1978.

*Primary Examiner*—Peter M. Cuomo
*Assistant Examiner*—Gary Estremsky
*Attorney, Agent, or Firm*—Quarles & Brady

[57] ABSTRACT

A valve lock has a body and a moveable jaw for releasably gripping a lever handle of the valve against the body. The jaw has a threaded shaft that extends through a hole in the body, and a locking cleat is slidable on the threaded shaft. An arm is attached to the shaft between the body and the locking cleat, and is rotatable about the shaft to abut either the valve or a pipe connected to the valve. A hand wheel is threaded onto the shaft and can be tightened against the locking cleat which then forces the arm against the body to inhibit rotation of the arm about the shaft. The locking cleat has an aperture for receiving the shackle of a padlock, and the hand wheel has a plurality of notches in an exterior surface with one of the notches receiving the shackle to restrict movement of the wheel along the shaft.

20 Claims, 3 Drawing Sheets

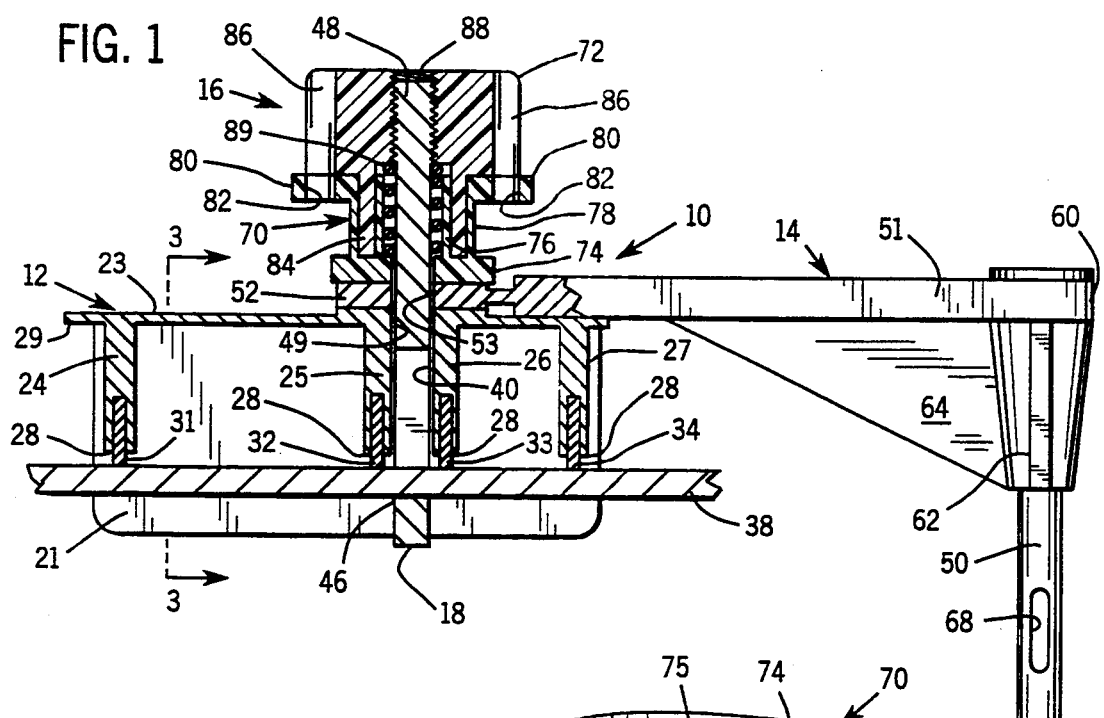
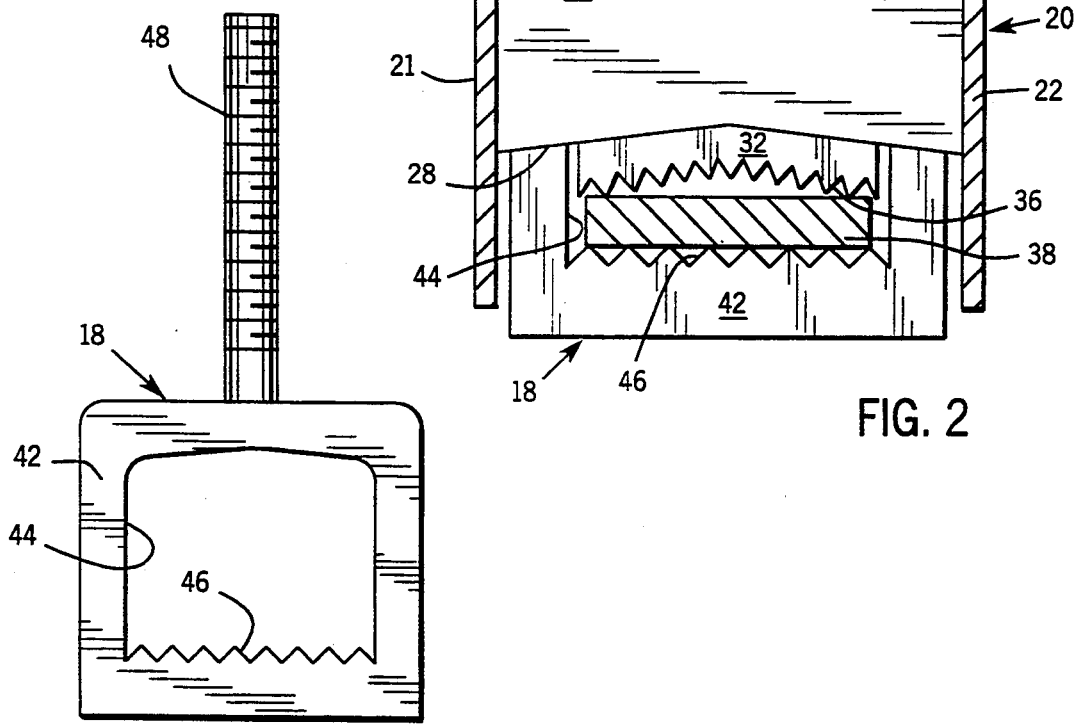

LOCKING DEVICE FOR A LEVER OPERATED VALVE

FIELD OF THE INVENTION

The present invention relates to devices which preclude unauthorized operation of a valve; and more particularly to a device which attaches to a lever handle which operates the valve and inhibits movement of that lever handle.

BACKGROUND OF THE INVENTION

A ball valve is a common type of mechanism for controlling the flow of a fluid through a pipeline. Such a valve has a housing with an inlet opening and an outlet opening to which sections of the pipeline are attached. Within the housing is a ball that has an aperture therethrough. The ball is attached to one end of a stem which extends through din opening in the housing and has a lever handle attached to the exterior end of the stem. The user is able to rotate the lever handle causing a corresponding rotation of the ball inside the valve housing. In a first orientation of the ball, the aperture therethrough is aligned with the inlet and outlet openings allowing the fluid to flow through the valve. When the handle is rotated ninety degrees from the first orientation, the aperture through the ball no longer is aligned with the inlet and outlet openings, instead a solid portion of the ball blocks fluid flow through the valve. The lever handle and the attached ball can be placed at other positions between the fully opened and fully closed orientations to throttle the flow of fluid through the valve.

In many applications of a ball valve, it is desirable to prevent unauthorized operation. Therefore, a locking mechanism is required to preclude moving the valve lever handle from either the fully opened or fully closed position without appropriate authorization. For example, when maintenance is being performed on equipment downstream from the valve, it is often necessary to lock the valve in a closed state to prevent someone from inadvertently opening the valve,, thereby releasing hazardous energy resulting in harm to personnel or equipment. There may also be a need to lock the valve in a specific throttle position to prevent someone from either increasing or decreasing the flow of fluid.

Further, there is a need for a device of the foregoing type that can be retrofitted to existing valves so as to obviate the expense of replacing many valves now in service with new valves that include a built-in locking feature. Lever handle operated ball valves also come in a wide variety of sizes and it is advantageous to enable a single locking mechanism to be utilized on a variety of different sizes and shapes of ball valves/block valves.

SUMMARY OF THE INVENTION

An object of the present invention is to provide a device that inhibits unauthorized operation of a lever handle operated valve.

Another object is to provide such a device that can be adapted for use with lever handle operated valves of different sizes and shapes.

A further object of the present invention is to provide a device which can inhibit operation of a valve that is in either the fully opened or fully closed positions, and which can be adapted to maintain the valve in an intermediate position between fully opened and fully closed.

These objects are accomplished by a locking device that comprises a body with an aperture. A movable locking jaw has a shaft that projects through the aperture in said body and releasably grips the lever handle against the body. An arm is pivotally attached to the shaft for engaging either the valve or a pipe connected to the valve. A fastener is attached to the shaft for tightening the arm against said body to prevent rotation of said arm about the shaft. In the preferred embodiment the fastener screws onto the shaft and can be tightened against the arm. Abutting surfaces of the fastener, arm and body preferably are knurled or geared to further prevent rotation of said arm about the shaft in a locked state of the device.

In use the locking device is placed onto the lever handle of the valve and the arm is pivoted about the shaft until abutting the valve or the pipe. The fastener then is tightened onto the shaft which draws the locking jaw toward the body, thereby gripping the lever handle tightly between the locking jaw and the body. The tightened fastener also forces the arm against the body, engaging the knurled or geared surface, thus preventing the arm from pivoting away from engagement with the valve or the pipe. That engagement precludes the lever handle from being moved. The locking device is adapted to receive a lock which prevents release of a tightened fastener.

In the opened or closed state of the valve, only a single arm may be required for the locking device to prevent movement of the lever handle. To lock the valve in an intermediate position, a pair of arms can be utilized to inhibit both clockwise and counterclockwise movement of the lever handle.

BRIEF DESCRIPTION OF THE DRAWINGS

FIG. 1 is a cross-sectional view of a valve locking mechanism according to the present invention;

FIG. 2 is a cross-section view taken along line 3—3 of FIG. 1;

FIG. 3 illustrates a locking jaw shown in FIG. 1;

DETAILED DESCRIPTION OF THE INVENTION

Figure 4:
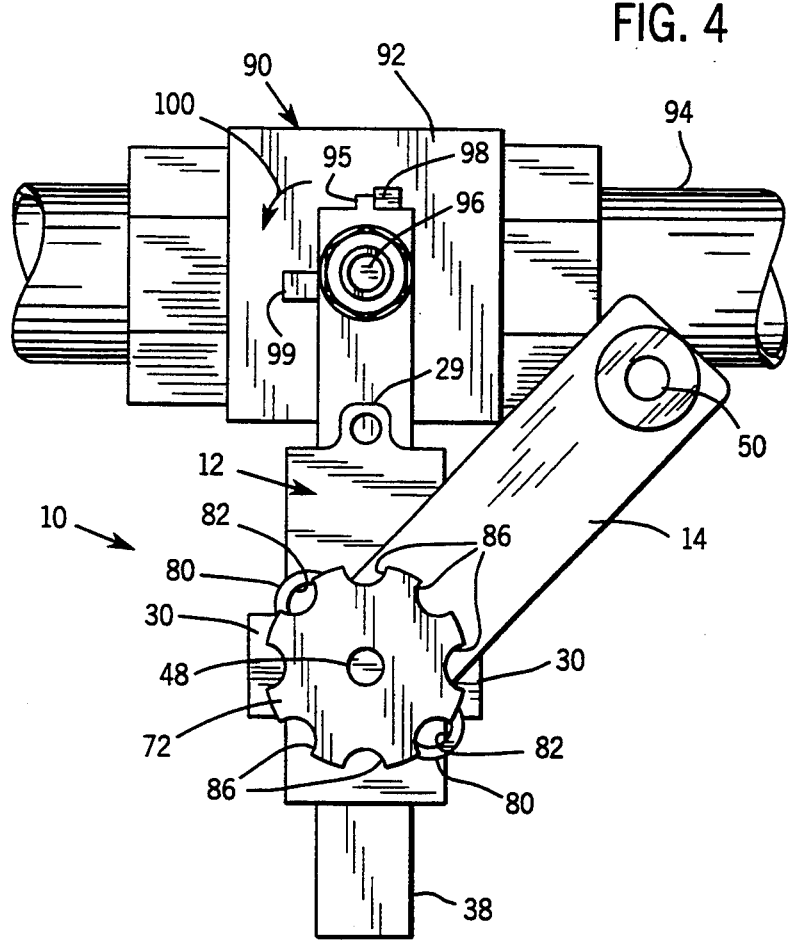
FIG. 4 shows the locking device attached to a valve in the closed state.

With initial reference to FIGS. 1 and 2, a locking device 10 for a lever handle operated valve includes a body 12, an arm 14, a fastener 16 and a locking jaw 18.

The body 12 has an inverted U-shaped shell 20 that has a pair of parallel side walls 21 and 22 connected by an upper wall 23 as seen best in FIG. 2. A pair of ears 30 project from the upper surface of the body shell 20 beyond the side walls 21 and 22 and are grasped by fingers of the user during placement of the locking device 10 on a valve lever. A projection 29 extends from one end of the upper wall 23 and has an aperture therethrough that receives a chain for hanging the locking device near a valve when not in use.

In FIG. 1 can be seen four transverse walls 24, 25, 26 and 27 that connect the side walls 21 and 22 and the upper wall 23. Transverse walls 24 and 27 are located near opposite ends of the body 12. The interior transverse walls 25 and 26 are offset toward one end of the body, i.e. those transverse walls are closer to transverse wall 27 than to transverse wall 24. The lower edge 28 of each of the transverse walls 24–27 is spaced upward from the lower edge of the two side walls 21 and 22 and has a rectangular groove cut therein. A separate blade 31, 32, 33 and 34 is press fit into the grooves in transverse walls 24, 25, 26 and 27, respectively. Each blade 31–34 has a concave lower edge 36 in which a plurality of triangular teeth are cut. The lower edges 36 of the four blades 31–34 are aligned with one another for grasping the upper surface of a valve lever handle 38.

Interior transverse walls 25 and 26 seen in FIG. 1 are spaced closely apart forming a channel 40 therebetween in which the locking jaw 18 is received. As shown in FIG. 3, the locking jaw 18 includes a rectangular frame-like plate 42 having a generally rectangular inner opening 44. The lower inner edge of the plate 42 has a plurality of teeth 46 cut therein for gripping the valve lever handle 38. A threaded shaft 48 is attached to the center edge of the plate 42 which is opposite the inner edge with the teeth 46. Returning to FIG. 1, when the locking jaw 18 is placed between the interior transverse walls 25 and 26, the threaded shaft 48 passes freely through an aperture 49 in the upper wall 23 and projects outwardly from the body 12. The locking jaw 18 can slide vertically between walls 25 and 26 in the orientation of the locking device 10 shown in FIG. 1. This movement of the locking jaw allows the valve lever handle 38 to slide longitudinally through the body 12 and the opening 44 of the locking jaw 18. The locking jaw plate 42 can be drawn upward into the body 12 to grip the lever handle 38 between the teeth 46 of the locking jaw and the blades 31–34 of the body to fixedly hold the locking device 10 on the lever. A relatively long lever handle 38 engages all of the blades 31–34, whereas a shorter lever handle can be inserted into the end of the body at which transverse wall 27 is located and engage only three blades 32, 33 and 34. The offset of the interior transverse walls 25 and 26 toward one end of the body 12 enables the locking device 10 to be adapted for use with valves having lever handles of different lengths.

The arm 14 has an L-shape formed by a lateral member 51 and a pin 50. The lateral member 51 has a disk-shaped end 52 with a centrally located aperture 53 through which the threaded shaft 48 passes pivotally attaching the arm adjacent the body 12. The aperture 53 in the disk-shaped end 52 has a larger diameter than the outer diameter of the screw thread on shaft 48 so that the arm 14 can rotate freely about the shaft. As shown specifically in FIG. 2, the disk-shaped end 52 has two opposed major surfaces 54 and 56 which are knurled or geared to form a series of peaks and valleys in both of those major surfaces. The outer surface of the upper wall 23 of body 12 has a circular raised portion with a flat surface 58 that also is knurled or geared. As will be described,, when the knurled or geared surface 56 of the arm 14 contacts the knurled surface 58 of the body, the peaks and valleys on the abutting surfaces engage or mesh to prevent rotation of the arm with respect to the body.

Arm 14 projects laterally beyond the body 12 terminating at a remote end 60 that has a tubular member 62 projecting downward. A triangular support bracket 64 extends from the underside of arm 14 to the tube 62 to add rigidity to the tube. A cylindrical pin 50 is located in an aperture in the tubular member 62 and projects from the lower end of that member in the orientation of the locking device 10 in FIG. 1. However, a user is able to disassemble the locking device 10 and invert the arm 14 so that pin 50 projects upward from the arm 14, if necessary for proper operation in a given installation. The pin 50 has a head which is press-fit into a countersunk recess in the upper surface of arm 14 to hold the pin in place. An elongated slot 68 is cut through an exposed portion of the pin to accommodate a plastic or stainless steel strap, which secures the pin to the pipeline. Alternatively, an L-shaped arm can be used thereby eliminating the need for a separate pin 50.

The fastener 16 is threaded onto the shaft 48 of the locking jaw 18 as shown in FIG. 1 and comprises a cylindrical locking cleat 70 and a hand wheel 72. The locking cleat 70 has a disk portion 74 with a centrally located aperture through which the pin 48 of the locking jaw 18 extends. The aperture in the disk portion is larger than the outer diameter of the screw thread on the shaft 48 so that the shaft is able to slide unobstructed through the locking cleat. As shown in FIG. 2, the lower surface 75 of the disk portion 74 is knurled or geared so that when surface 75 is forced against surface 54 of arm 14, the peaks and valleys of the two knurled or geared surfaces mesh, thereby restricting rotational movement between the locking cleat 70 and the arm 14. Inner and outer tubes 76 and 78 of the locking cleat 70 extend upward from the disk portion 74 and both tubes are coaxial with the aperture through the disk portion. A pair of tabs 80 extend horizontally outward in diametrically opposite directions from the remote end of the outer tube 78. Each of the tabs 80 has an aperture 82 therethrough for receiving the shackle of a padlock, as will be described.

The hand wheel 72 has a tubular projection 84 that extends in between the inner and outer tubes 76 and 78 of the locking cleat 70 and is slidable therein. As shown in FIGS. 1 and 4, the hand wheel 72 has a generally circular shape with a plurality of notches 86 extending longitudinally in the outer circumferential surface of the hand wheel. These notches not only provide a gripping surface for the installer of the locking device 10, but also receive the shackle of a padlock inserted through aperture 82 in one of the tabs 80 on the locking cleat. The hand wheel has a centrally located threaded aperture 88 that engages the screw thread on the shaft 48 of the locking jaw 18 so that the hand wheel 72, upon being rotated, moves along shaft 48. A compression spring 89 is positioned around the shaft 48 within the inner tube 76 of the locking cleat 70. Rotation of the hand wheel 72 on shaft 48 in one direction compresses the spring and in the opposite direction allows the spring 89 to expand. Thus, the spring 89 biases the hand wheel 72 away from the locking cleat 70 so as to draw the locking jaw 18 upward into the body 12.

With reference to FIG. 4, the locking device can be used with a valve 90 that has a housing 92 connected to a pipeline 94. The lever handle 38 of the valve 90 is coupled at one end to valve stem 96 to enable the user to rotate the valve stem and thus operate the valve between open and closed positions. The one end of the lever handle 38 has a tab 95 which abuts a first stop 98 on the valve housing 92 when the valve is in the fully closed position as illustrated in FIG. 4. The valve housing 92 also has a second stop 99 which the lever handle tab 95 abuts when the valve is in the fully open position.

In order to place the locking device 10 onto the lever handle 38 of the valve 90, the user loosens the hand wheel 72 and then pushes the hand wheel into the locking cleat 70, causing the locking plate teeth 46 to move away from the blades 32 and 33 of body 12. This creates an opening between the locking jaw and the body through which the end of the lever handle 38 can be inserted. Once the body 20 has been fully inserted onto the lever handle 38, the remote end of the lever handle extends beyond the body as shown in FIG. 1o Then the user can release the hand wheel 72 allowing spring 89 to push the handle away from the locking cleat 70, causing the locking jaw plate 42 to retract into the body 12. Compression spring 89 forces the teeth 46 of locking jaw 18 against the lower surface of the lever handle 38 drawing the handle against the blades 31-34 of body 12. This biasing action provided by the spring 89 is sufficient to hold the locking device 16 onto the lever handle 38 during further installation steps. However, the force exerted by spring 89 is not significant to prevent the arm 14 to be rotated between the locking cleat 70 and the body 12. This allows the user to rotate the arm 14 until pin 50 contacts either the valve housing 92 or the pipeline 94 as shown in FIG. 4. In this orientation, the arm 14 is placed on the side of the lever handle 38 toward which the lever handle must move in order to open the valve 90. In the locked position, a plastic or stainless steel strap may be passed through the elongated aperture 68 in pin 50 as shown in FIG. 1 and around the pipeline 94 to hold the pin in close proximity to the pipeline.

The user then tightens the hand wheel 72 until the hand wheel forces the cleat against the arm 14. This action also presses the arm 14 against the upper surface of body 12. When the hand wheel 72 is fully tightened, the knurled or geared surface 75 of the locking cleat 70 engages the knurled surface 54 of the arm 14, as shown in FIG. 2. The other knurled surface 56 of the arm 14 also engages the knurled surface 78 on the body 12. The peaks and valleys of these knurled surfaces mesh when the hand wheel 72 is fully tightened, thus preventing the arm 14 from rotating with respect to the body 12. The user completes the tightening of the hand wheel 72 by aligning one of the notches 86 with the aperture 82 in a tab 80 of locking cleat 70. This orientation allows the shackle of a padlock (not shown) to be inserted through aperture 82 and locked on the tab 80. The shackle prevents the hand wheel 72 from being turned since the side wall of the corresponding notch 86 will strike the shackle if rotation is attempted. A second padlock may be inserted through the other tab 80 of the locking cleat 70, thus requiring two separate keys in order to remove both padlocks and operate the valve.

In the fully closed position of the valve 90 shown in FIG. 4, abutment of the lever handle tab 95 against the first valve housing stop 98 prevents clockwise rotation of the lever handle 38. Thus the valve lever handle 38 must be rotated counterclockwise as denoted by arrow 100 in order to open the valve. However, the locking device 10, and specifically pin 50 at the end of arm 14 being pressed against the pipeline 94, prevents counterclockwise rotation of the lever handle and precludes unauthorized opening of the valve 90. The valve lever handle 38 can not move unless the locking device's arm 14 rotates about shaft 48. However, the hand wheel 72 tightened on shaft 48 draws the locking jaw 18 against the lever handle 38 causing the arm 14 to be tightly sandwiched between the body 12 and the locking cleat 70. This force compresses the lever handle 14 between the cleat and the body and the abutting knurled or geared surfaces of these components prevent the arm 14 from rotating with respect to the body 122 of the locking device 10. The teeth on locking jaw 18 and blades 31-34 preclude the locking device from sliding along the lever handle 38. Therefore, any attempt to rotate the lever handle 38 in the clockwise direction will be inhibited by the locking device.

A user who is authorized to operate the locked valve can remove the padlock from the locking cleat 70, enabling the hand wheel 72 to be turned, releasing the force that holds the arm 14 between the locking cleat 70 and the body 12. This enables the arm 14 to be rotated about shaft 48 away from pipeline 92 so that the lever handle 38 may be rotated toward the open position.

Figure 5:
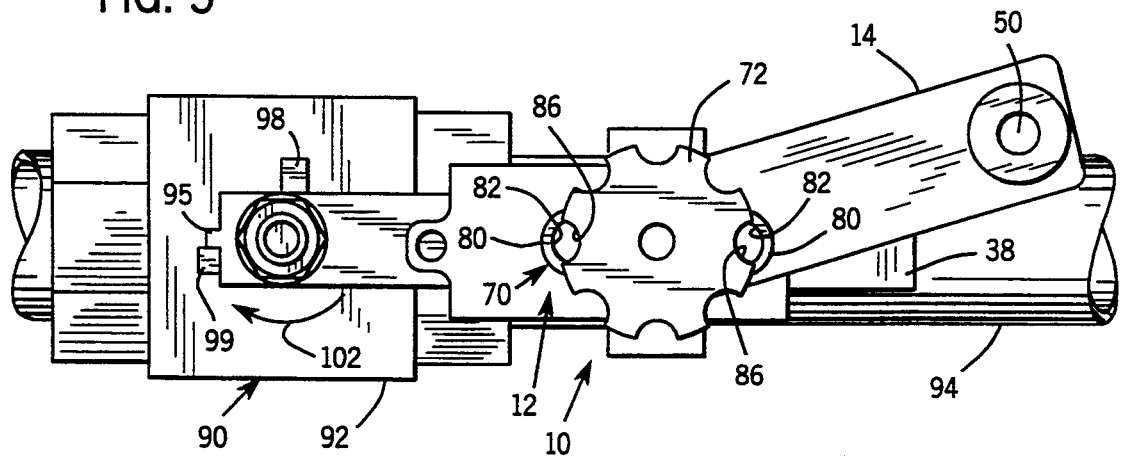
FIG. 5 illustrates the locking device attached to the valve in the open state.

The locking device 10 can also be used to lock the valve 90 in the fully opened position as illustrated in FIG. 5. In this case, the lever handle 38 is rotated to be parallel with the pipeline 94 with the tab 95 on the lever handle abutting the second stop 99 on the valve housing 92. The locking device 10 is placed onto the lever handle 38 in the same manner as previously described. With the locking wheel 72 loosened, the arm 14 is rotated so the pin 50 is on the opposite side of the pipeline 94 from the orientation previously described and shown in FIG. 4. The user then holds the pin 50 firmly against the pipeline 94 while tightening the hand wheel 72. This action draws the locking jaw 18 upward into tile body 12 as shown in FIG. 1 until the teeth of the locking jaw 18 firmly hold the lever handle against the blades of the body 12 and the hand wheel 7 becomes tightened fully against the locking cleat 70. This action firmly sandwiches the arm 14 between the locking cleat 70 and the body 12 preventing rotation of the arm from occurring. The hand wheel 72 then is tightened until a pair of its notches 86 are aligned with the apertures 82 in the locking cleat 70. In this orientation, the shackle of one or two padlocks can be locked in place through the apertures 82, thereby inhibiting the hand wheel 72 from being loosened.

Since in the fully open position of valve 92, the lever handle 38 must be rotated in the clockwise direction indicated by arrow 102, the engagement of the pin 50 against the opposite side of the pipeline 94 prevents such rotation. Unlocking of the device and loosening the hand wheel 72 releases the force against the arm 14, allowing it to rotate about shaft 48 and the valve to be opened. The valve locking device 10 may have to be fully removed from lever handle 38 in order to place the valve lever handle in the fully open position.

Figure 6:
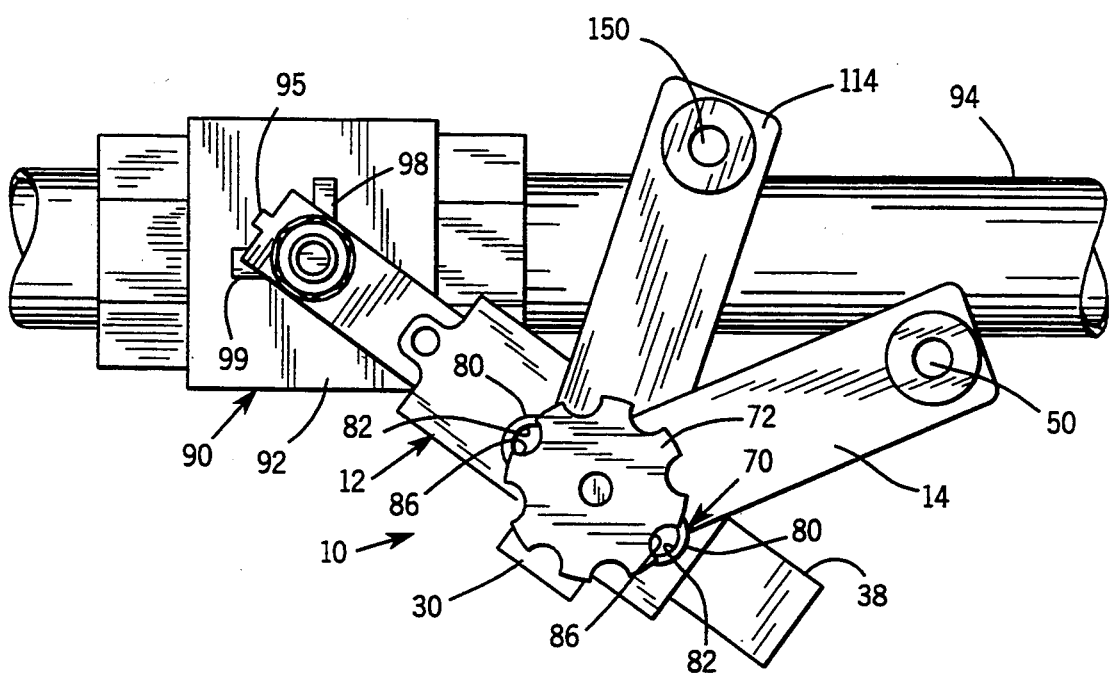
FIG. 6 illustrates the locking device attached to the valve in an intermediate position where the flow of fluid is throttled.

In addition to securing the valve 90 in either the fully opened or fully closed positions, the locking device 10 may be adapted to hold the valve in an intermediate position, as illustrated in FIG. 6. For purpose, a second arm 114 has been inserted on shaft 48 either above or below the first arm 14. The disk shaped ends 52 of both arms 14 and 114 are positioned along the shaft 48 between body 12 and locking cleat 70. The lever handle 38 is placed in the position where the fluid flowing through the pipeline is properly throttled and the locking device 10 is inserted over the lever handle 30 as previously described. The two arms 14 and 114 are positioned so that their respective pins 50 and 150 abut opposite sides of the pipeline 94. When the locking device 10 is locked in place, the two arms are squeezed together so that their respective pins 50 and 150 are firmly held against the pipeline 94 and cannot be removed from the arms without releasing the locking device. While the two arms are squeezed together, the user then tightens the hand wheel 72 to compress the two arms 14 and 114 between the locking cleat 70 and the body 12. When the hand wheel 72 is fully tightened, the knurled or geared surfaces of the locking cleat 70, arms 14 and 114 and the body 12 prevent the arms from rotating. Thus, both clockwise and counterclockwise rotation of the lever handle 38 is prevented. The locking device 10 may be secured in this position by one or a pair of padlocks having shackles inserted through the apertures 82 in the locking cleat 70.

The novel locking device 10 has a number of features that allow easy adaption for use with a variety of different types of valves. For example, the locking device 10 accommodates different sizes and shapes of valves by rotating the arm 14 with respect to body 12 during the installation. The concave, edges of blades 31–34 are able to engage lever handles 38 of different widths. Further, the body 12 may be slid along the lever handles to various positions depending upon the length of the particular lever handle 38 and the size of the valve housing 94. The offset of the interior transverse walls 25 and 26 toward one end of the body 12 enables the locking device 10 to be adapted for use with valves having relatively short lever handles that can not engage all of the transverse walls.

We claim:

1. A locking device for use with a valve having a housing for connection to a pipeline and a lever handle rotatable between an open position and a closed position, said locking device comprising:
   a body having an aperture therethrough;
   a locking jaw for releasably gripping the lever handle against said body, and having a shaft that projects through the aperture in said body;
   an arm pivotally attached to the shaft for engaging either one of the valve and the pipeline; and
   a fastener coupled to the shaft for releasably forcing said arm against said body to prevent rotation of said arm about the shaft.

2. The locking device as recited in claim 1 wherein said fastener includes a locking cleat having an aperture through which the shaft extends and which abuts said arm in a locked state of the locking device; and a hand wheel threaded onto the shaft to press said locking cleat against said arm.

3. The locking device as recited in claim 2 wherein said locking cleat has a hole for receiving a lock; and said hand wheel has a notch that is engaged by the lock to restrict rotation of the hand wheel about the shaft.

4. The locking device as recited in claim 1 wherein said fastener includes a mechanism to receive a lock in a manner which prevents said fastener from releasing said arm from being forced against said body.

5. The locking device as recited in claim 1 wherein the said body comprises:
   a shell having a U-shape formed by first and second walls connected by a third wall; and
   a plurality of transverse walls within said shell and connected to the first and second walls with each of said plurality of transverse walls having an edge for gripping the lever handle.

6. The locking device as recited in claim 5 wherein the edge of each of the plurality of transverse walls has a plurality of teeth for gripping the lever handle.

7. The locking device as recited in claim 5 wherein the edge of each of the plurality of transverse walls is concave and has a plurality of teeth for gripping the lever handle.

8. The locking device as recited in claim 1 wherein the said body comprises:
   a shell having a U-shape formed by first and second walls and a third wall connecting the first and second walls;
   first and second transverse walls connected to the first and second walls adjacent opposite ends of said shell; and
   third and fourth transverse walls connected to the first and second walls between said first and second transverse walls, with a first distance between said first and third transverse walls being greater than a second distance between said second and fourth transverse walls;
   wherein the aperture of said body is in said third wall between said third and fourth transverse walls.

9. The locking device as recited in claim 1 wherein said locking jaw comprises a plate with an opening therethrough to receive the lever handle, and the shaft projects from an edge of the plate.

10. The locking device as recited in claim 9 wherein said locking jaw has a plurality of teeth on a surface which forms the opening.

11. The locking device as recited in claim 1 wherein said fastener has a first surface with peaks and valleys, said arm has second and third surfaces with peaks and valleys, and said body has a fourth surface with peaks and valleys, wherein the first and second surfaces are abutting when the locking device is fastened onto the lever handle, and the third and fourth surfaces are abutting when the locking device is fastened onto the lever handle.

12. The locking device as recited in claim 1 wherein said arm has an L-shape formed by first and second members, wherein the first member has an aperture through which the shaft passes.

13. The locking device as recited in claim 1 wherein the shaft has an outer surface with a screw thread, and said fastener has a threaded aperture that engages the shaft.

14. A locking device for use with a valve having a housing for connection to a pipeline and a lever handle rotatable between an open position and a closed position, said locking device comprising:
   a body having an aperture therethrough;
   a locking jaw for releasably gripping the lever handle against said body, and having a threaded shaft that projects through the aperture in said body;
   a locking cleat slidably located on the threaded shaft and having a tab with a lock aperture for receiving a shackle of a padlock;
   an arm located on the threaded shaft between said body and said locking cleat, and rotatable about the threaded shaft for engaging either one of the housing and the pipeline; and
   a wheel having a threaded aperture engaging either the threaded shaft, and having an outer surface with a notch for receiving the shackle received in the lock aperture of said locking cleat to thereby restrict rotation of said wheel about the threaded shaft.

15. The locking device as recited in claim 14 further comprising a compression spring located on the shaft between said locking cleat and said wheel.

16. The locking device as recited in claim 14 wherein said locking cleat has a first surface with peaks and valleys, and said arm has a second surface with peaks and valleys; wherein the peaks and valleys of said first and second surfaces mesh to inhibit movement therebetween when the locking device is fastened onto the lever handle.

17. The locking device as recited in claim 14 wherein said arm has a first surface with peaks and valleys, and said body has a second surface with peaks and valleys; wherein the peaks and valleys of said first and second surfaces mesh to inhibit movement therebetween when the locking device is fastened onto the lever handle.

18. The locking device as recited in claim 14 wherein the said body comprises:
   a shell having a U-shape formed by first and second walls and a third wall connecting the first and second walls; and
   a plurality of transverse walls connected to the first, second and third walls with each of said plurality of transverse walls having an edge for gripping the lever handle.

19. The locking device as recited in claim 14 wherein said locking jaw comprises a plate with a rectangular aperture that receives the lever handle, and the shaft projects from an edge of the plate.

20. A locking device for use with a valve having a housing for connection to a pipeline and a lever handle rotatable between an open position and a closed position, said locking device comprising:
   a body having a U-shaped shell formed by first and second walls, a third wall connected between the first and second walls and having an aperture, and a plurality of transverse walls connected to the first, second and third walls;
   a locking jaw located between the first and second walls of said body for releasably gripping the lever handle against the plurality of transverse walls, and having a threaded shaft that projects through the aperture in the third wall;
   a locking cleat slidably located on the threaded shaft and having a tab with an aperture for receiving a shackle of a padlock;
   an arm located on the threaded shaft between said body and said locking cleat and rotatable about the threaded shaft for engaging one of the housing and the pipeline;
   a wheel with a threaded aperture which engages the threaded shaft so that said wheel can be tightened against said locking cleat, and having an outer surface with a notch for receiving the shackle of the padlock to restrict rotation of said wheel about the shaft; and
   a spring biasing said locking cleat away from said wheel.

* * * * *

UNITED STATES PATENT AND TRADEMARK OFFICE
CERTIFICATE OF CORRECTION

PATENT NO. : 5,415,017
DATED : May 16, 1995
INVENTOR(S) : Benda, et al

It is certified that error appears in the above-indentified patent and that said Letters Patent is hereby corrected as shown below:

Col. 1, line 19      "din" should be --an--.

Col. 1, line 43      Delete the second ",".

Col. 3, line 57      Delete the second ",".

Col. 5, line 7       "lo" should be --1.--.

Col. 6, line 1       "122" should be --12--.

Col. 6, line 26      "into tile" should be --into the--.

Signed and Sealed this

Twenty-ninth Day of August, 1995

Attest:

BRUCE LEHMAN

*Attesting Officer*              *Commissioner of Patents and Trademarks*